(12) United States Patent
Scott, II et al.

(10) Patent No.: US 10,782,777 B2
(45) Date of Patent: Sep. 22, 2020

(54) REAL-TIME ALTERATION OF STANDARD VIDEO AND IMMERSIVE VIDEO FOR VIRTUAL REALITY

(71) Applicant: INTERNATIONAL BUSINESS MACHINES CORPORATION, Armonk, NY (US)

(72) Inventors: Willie L. Scott, II, Austin, TX (US); Kuntal Dey, Vasant Kunj (IN); Mohit Jain, Bengaluru (IN); Charu Pandhi, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 7 days.

(21) Appl. No.: 16/203,932

(22) Filed: Nov. 29, 2018

(65) Prior Publication Data
US 2020/0174559 A1 Jun. 4, 2020

(51) Int. Cl.
*G06F 3/01* (2006.01)
*G06F 3/0481* (2013.01)
*G06F 1/16* (2006.01)

(52) U.S. Cl.
CPC ............ *G06F 3/013* (2013.01); *G06F 1/1694* (2013.01); *G06F 3/04815* (2013.01); *G06F 2203/04806* (2013.01)

(58) Field of Classification Search
CPC .................. G06F 3/013; G06F 1/1694; G06F 2203/04806; G06F 3/04815
See application file for complete search history.

(56) References Cited

U.S. PATENT DOCUMENTS

| | | | |
|---|---|---|---|
| 8,154,583 B2 | 4/2012 | Kurtz et al. | |
| 8,649,606 B2 | 2/2014 | Zhao et al. | |
| 8,670,019 B2 | 3/2014 | Byers | |
| 9,454,225 B2 | 9/2016 | Bychkov et al. | |
| 9,830,529 B2 | 11/2017 | Jetley et al. | |
| 9,851,793 B1 | 12/2017 | Van Hoff et al. | |
| 9,898,082 B1 * | 2/2018 | Greenwald | G06F 3/013 |

(Continued)

FOREIGN PATENT DOCUMENTS

| | | |
|---|---|---|
| KR | 20160090065 A | 7/2016 |
| WO | 2015103414 A1 | 7/2015 |

OTHER PUBLICATIONS

Li, G., et al., "Visual Saliency Based on Multiscale Deep Features", Retrieved Apr. 10, 2015, Department of Compuer Science, The University of Hong Kong, pp. 1-9.

(Continued)

*Primary Examiner* — Muhammad N Edun
(74) *Attorney, Agent, or Firm* — Cantor Colburn LLP; Brian Welle

(57) ABSTRACT

Provided are systems, methods, and media for real-time alteration of video. An example method includes presenting a video to a user. The method includes monitoring a gaze point of the user as the user views one or more frames of the video. The method includes, in response to a determination that the monitored gaze point of the user is different from a predetermined target gaze point, changing the orientation of the video to reposition the target gaze point of the video to the monitored gaze point of the user, in which the orientation of the video is changed during the presentation of the video to the user.

17 Claims, 6 Drawing Sheets

(56) References Cited

U.S. PATENT DOCUMENTS

| | | | |
|---|---|---|---|
| 2011/0018862 A1* | 1/2011 | Epps | G06T 13/40 |
| | | | 345/419 |
| 2011/0229025 A1 | 9/2011 | Zhao et al. | |
| 2013/0083009 A1* | 4/2013 | Geisner | A63F 13/02 |
| | | | 345/419 |
| 2017/0193686 A1 | 7/2017 | Mullins | |
| 2017/0308770 A1 | 10/2017 | Jetley et al. | |

OTHER PUBLICATIONS

Matheson; "Virtual-reality system for the elderly wins health care prize"; MIT News Office; Feb. 24, 2017; 4 pages.

Mell et al.; "The NIST Definition of Cloud Computing—Recommendations of the National Institute of Standards and Technology"; U.S. Department of Commerce, Sep. 2011; 7 pages.

Wang, Q., et al., "Interactive Eye Tracking for Gaze Strategy Modification", Conference Paper, Jun. 2015, Research Gate, 5 pages.

\* cited by examiner

US 10,782,777 B2

REAL-TIME ALTERATION OF STANDARD VIDEO AND IMMERSIVE VIDEO FOR VIRTUAL REALITY

BACKGROUND

The present invention generally relates to video processing, and more specifically, to cognitive real-time alteration of standard video and immersive video for virtual reality based on gaze tracking.

Eye gaze training has been used to assist in rehabilitating children and others suffering from various types of cognitive or learning difficulties and disabilities. For example, experiments using eye gaze tracking have shown that individuals with cognitive disabilities, such as autism, tend to differ in eye gazing behavior as compared to those who do not suffer from those challenges.

Preliminary studies have demonstrated the feasibility of improving eye gaze behavior (and correspondingly increased engagement, attentiveness and comprehension) of people on the autism spectrum via adaptive training of eye gaze on a video viewing task, by blurring out the parts of the screen on which the people mistakenly gaze and only retaining the desired (target) portions, thereby encouraging them to look at the desired portions of the screen. As some videos have a main target portion on a screen (e.g., a main object moving, a person speaking etc.), blurring out the rest of the screen can lead to the viewer losing the meaning of the overall video (e.g., losing the video's context, overall background, etc.).

SUMMARY

Embodiments of the present invention provide a computer-implemented method for real-time alteration of video. A non-limiting example of the computer-implemented method includes presenting, by a system comprising one or more processors, a video to a user. The method includes monitoring, by the system, a gaze point of the user as the user views one or more frames of the video. The method includes in response to a determination that the monitored gaze point of the user is different from a predetermined target gaze point, changing, by the system, the orientation of the video to reposition the target gaze point of the video to the monitored gaze point of the user. The orientation of the video is changed during the presentation of the video to the user.

Embodiments of the present invention provide a system for real-time alteration of video. A non-limiting example of the system includes one or more processors configured to perform a method. A non-limiting example of the method includes presenting, by the system, a video to a user. The method includes monitoring, by the system, a gaze point of the user as the user views one or more frames of the video. The method includes in response to a determination that the monitored gaze point of the user is different from a predetermined target gaze point, changing, by the system, the orientation of the video to reposition the target gaze point of the video to the monitored gaze point of the user. The orientation of the video is changed during the presentation of the video to the user.

Embodiments of the invention provide a computer program product for real-time alteration of video, the computer program product comprising a computer readable storage medium having program instructions embodied therewith. The program instructions are executable by a system comprising one or more processors to cause the system to perform a method. A non-limiting example of the method includes presenting, by the system, a video to a user. The method includes monitoring, by the system, a gaze point of the user as the user views one or more frames of the video. The method includes in response to a determination that the monitored gaze point of the user is different from a predetermined target gaze point, changing, by the system, the orientation of the video to reposition the target gaze point of the video to the monitored gaze point of the user. The orientation of the video is changed during the presentation of the video to the user.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
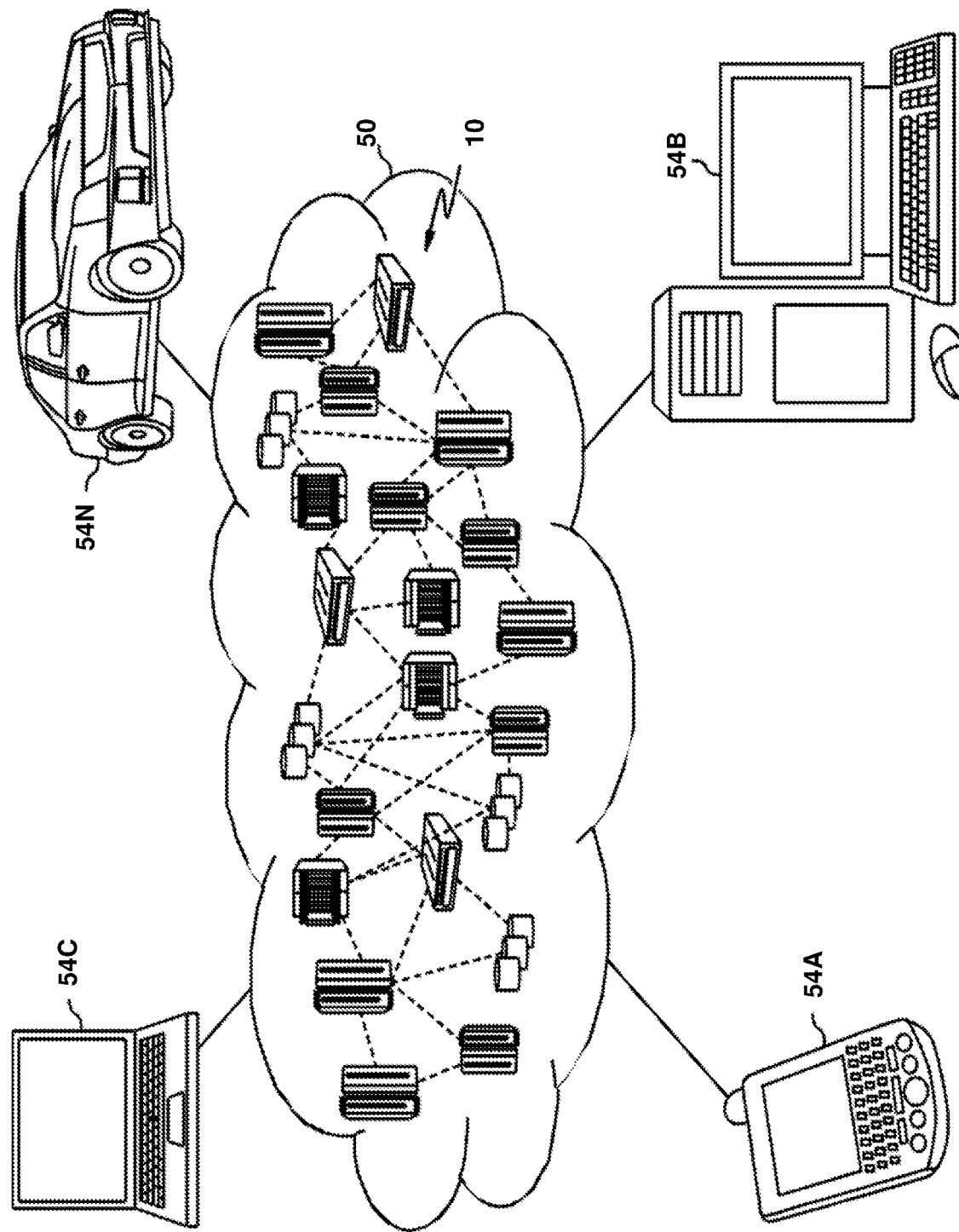
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two-digit or three-digit reference numbers. With minor exceptions (e.g., FIGS. 1-2), the leftmost digit of each reference number corresponds to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
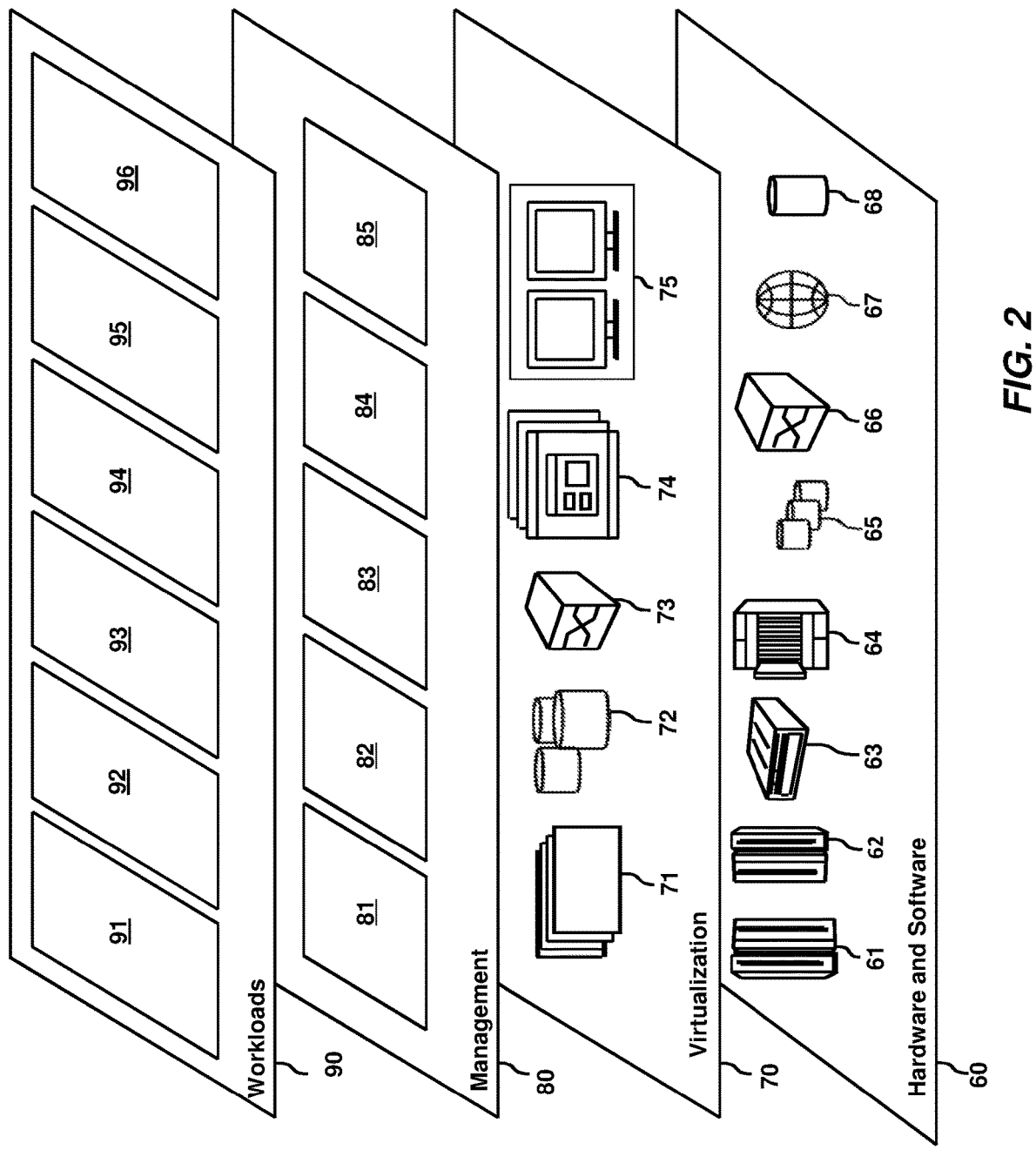
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and video alteration processing 96.

Turning now to an overview of technologies that are more specifically relevant to aspects of the invention, as noted above, eye gaze training can be used to assist in rehabilitating children and others suffering from various types of cognitive or learning difficulties and disabilities. For example, experiments using eye gaze tracking have shown that individuals with cognitive disabilities, such as autism, tend to differ in eye gazing behavior as compared to those who do not suffer from those challenges.

Preliminary studies have demonstrated the feasibility of improving eye gaze behavior (and correspondingly increased engagement, attentiveness, and comprehension) of people on the autism spectrum via adaptive training of eye gaze on a video viewing task, by blurring out the parts of the screen on which the people mistakenly gaze and only retaining the desired (target) portions, thereby encouraging them to look at the desired portions of the screen. As some videos have a main target portion on a screen (e.g., a main object moving, a person speaking etc.), blurring out the rest of the screen can lead to the viewer losing the meaning of the overall video (e.g., losing the video's context, overall background, etc.).

The technical problem caused by the adaptive training processes identified above becomes even more evident in immersive environments, such as when a user views video formatted for Virtual Reality (VR) applications, with 270 degree field of view (FOV). A process that blurs out parts of a video does not readily work with VR video as the field of view of the user at a given time changes. A blurred part may not be even in the field of view of the individual (e.g., blurred out object is behind the user viewing the video).

Due to the free-flowing and open nature of immersive VR experiences, VR introduces a number of unique challenges as it relates to encouraging users to focus on a particular target portion of a FOV. In consuming standard and immersive VR video, the human eye and brain does not see just a point—it sees and processes an entire screen or FOV passively even though an active focus may be on desired objects/people/items of interest. However, no cognitive solution presently exists for assisting users (including, but not limited to, individuals with mental deficiencies) to view a desirable (target) part of the screen or FOV while keeping the rest of the screen or FOV viewable to the extent possible rather than blurring the screen.

Turning now to an overview of the aspects of the invention, one or more embodiments of the invention address the above-described shortcomings of the prior art by providing a computing system that is configured to alter standard video and immersive VR video consumption in real time, using a video reorientation technique for real-time video alteration. In general, the computing system performs a video viewing behavior correction by instructing a user to view other portions of the given video screen with respect to a currently viewed portion of the screen. In some embodiments of the present invention, this is achieved by shifting the video orientation, thus repositioning the expected gaze point of the video to the actual gaze point. The user is thus able to look at the desired point within the video using panning and zooming into the video without moving their gaze. In some embodiments of the present invention, the computing system configured to update the video orientation iteratively and slowly to bring the video back to the origin, by reducing the zooming and panning video reorientation component to nil, based on the eye gaze updates and accordingly ensure appropriate video orientation updates. In some embodiments of the present invention, if the gaze is on the correct (i.e., targeted) portion of the video then the orientation is eliminated completely by the computing system until the gazing behavior deviates again from the target. The approach referenced above is able to alter video-watching experiences in real time using a video reorientation technique to emphasize to (e.g., train) users "what to watch" in a given standard video or immersive VR video at a given point in time.

For example, in some embodiments of the present invention, the computer system is configured to present a video to a user, monitoring a gaze point of the user within the video as the user views one or more frames of video, and then changing the orientation of the video in response to a determination that the monitored gaze point of the user is different from a predetermined target gaze point (e.g., machine learned target gaze point, user defined target gaze point, machine learned important object within the video, user defined important object within the video, etc.). In some embodiments of the present invention, the orientation of the presented video is changed by panning and/or zooming in the video to reposition the target gaze point of the video to the actual gaze point. The reorientation of the video results in the user being able to gaze directly at target content without needing to change the location of their gaze within a frame. In some embodiments of the present invention, after reorienting the video, the video is reverted to its original state in a slow and interactive manner by reducing the zoom and/or pan at a predetermined rate (e.g., machine learned rate, user defined rate, etc.). In some embodiments of the present invention, at each iterative step towards the original state, the viewer's eye gaze is evaluated. If the evaluation of a given iteration determines that the gaze of the user is presently on the target gaze point of the video, then the system continues to reduce the zoom and pan. If the evaluation of a given iteration determines that the gaze of the user is not presently on the target gaze point of the video, then the system again reorients the video (e.g., via panning and/or zooming) to reposition the target gaze point of the video to the present actual gaze point of the user.

Figure 3:
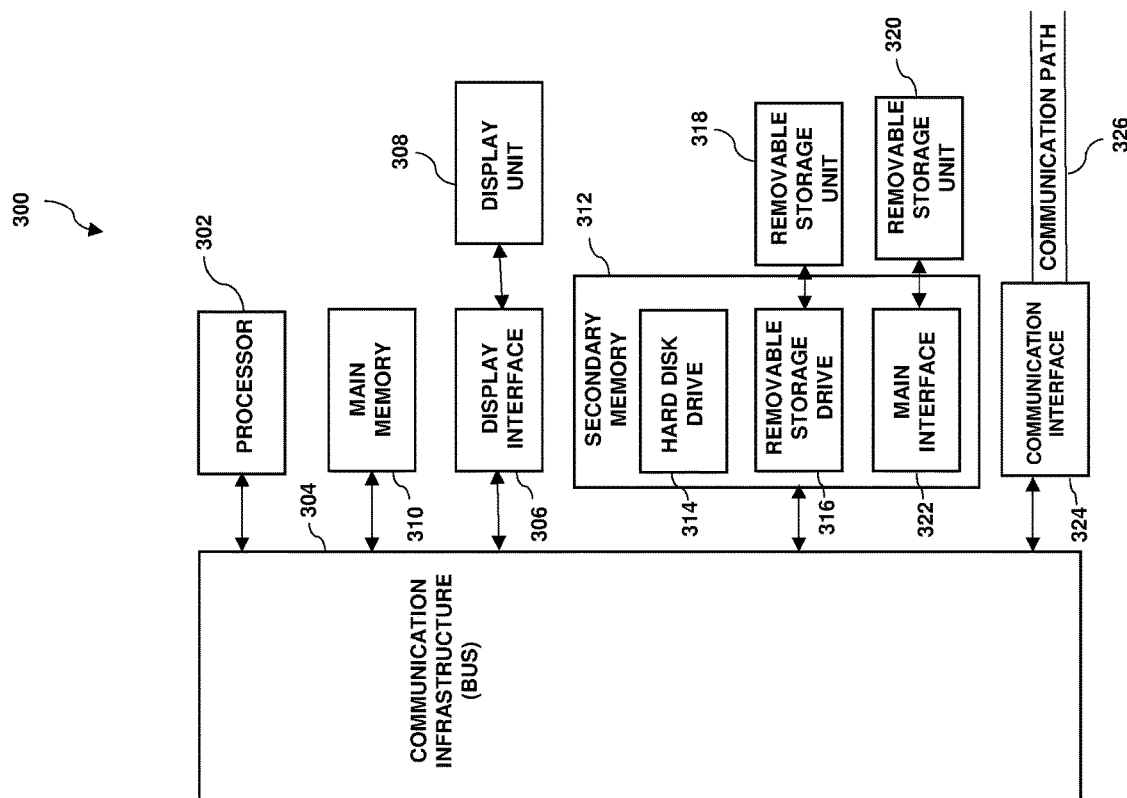
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 that is useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc., which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using a wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
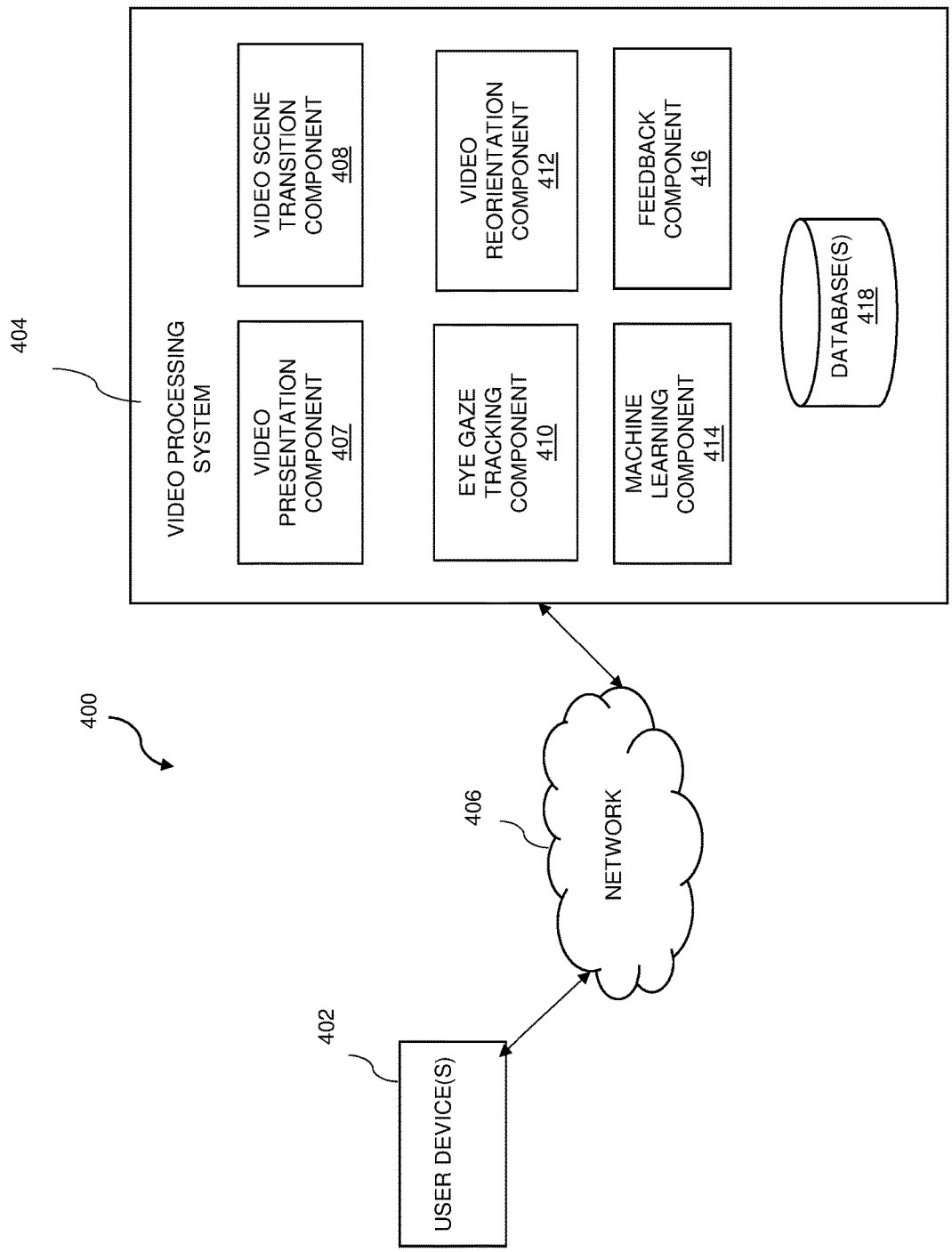
FIG. 4 depicts an example distributed environment in accordance with one or more embodiments of the present invention.

Referring now to FIG. 4, an example distributed environment 400 is presented for real-time alteration of video. Distributed environment 400 includes one or more user devices 402 and a video processing system 404, which are interconnected via network 406. FIG. 4 provides an illustration of only one example system and does not imply any limitation with regard to other systems in which different embodiments of the present invention may be implemented. Various suitable modifications to the depicted environment may be made, by those skilled in the art, without departing from the scope of the invention as recited by the claims.

Video processing system 404 includes a video presentation component 407, a video scene transition component 408, an eye gaze tracking component 410, a video reorientation component 412, a machine learning component 414, a feedback component 416, and database 418. In some embodiments of the present invention, database 418 includes one or more video related databases such as, for example, a video scene transition repository, a video repository, and/or a video scene target gaze zone viewing behavior repository. In some embodiments of the present invention, video presentation component 407, video scene transition component 408, eye gaze tracking component 410, video reorientation component 412, machine learning component 414, feedback component 416, and/or database 418 are interconnected via a communication infrastructure 304 and/or communication path 326. Video processing system 404 may have internal and external hardware components, such as those depicted and described above with respect to FIG. 3.

Video processing system 404 is a machine learning system that can be utilized to solve a variety of technical issues (e.g., learning previously unknown functional relationships) in connection with technologies such as, but not limited to, machine learning technologies, video processing technologies, virtual reality technologies, data analytics technologies, data classification technologies, data clustering technologies, recommendation system technologies, signal processing technologies, and/or other digital technologies. Video processing system 404 employs hardware and/or software to solve problems that are highly technical in nature, that are not abstract and that cannot be performed as a set of mental acts by a human.

In certain embodiments of the invention, some or all of the processes performed by video processing system 404 are performed by one or more specialized computers for carrying out defined tasks related to machine learning. In some embodiments of the invention, video processing system 404 and/or components of the system are employed to solve new problems that arise through advancements in technologies mentioned above.

Machine learning is often employed by numerous technologies to determine inferences and/or relationships among digital data. For example, machine learning technologies, signal processing technologies, image processing technologies, data analysis technologies, and/or other technologies employ machine learning models to analyze digital data, process digital data, determine inferences from digital data, and/or determine relationships among digital data. Machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

In some embodiments of the present invention, video processing system 404 is a standalone computing device, a management server, a web server, a mobile computing device, or other suitable electronic device and/or computing system capable of receiving, sending, and processing data. In some embodiments of the present invention, video processing system 404 is a server computing system utilizing multiple computers, such as in cloud computing environment 50. In some embodiments of the present invention, video processing system 404 is a laptop computer, a tablet computer, a netbook computer, a personal computer (PC), a desktop computer, a personal digital assistant (PDA), a smart phone, or other suitable programmable electronic device capable of communicating with user device 402 and other computing devices (not shown) within distributed environment 400 via network 406. In some embodiments of the present invention, video processing system 404 is a computing system utilizing clustered computers and components (e.g., database server computers, application server computers, etc.) that act as a single pool of seamless resources that are accessible within distributed environment 400. Video processing system 404 may have internal and external hardware components, such as those depicted and described above with respect to FIG. 3.

Network 406 can be, for example, a telecommunications network, a local area network (LAN), a wide area network (WAN), such as the Internet, or a combination of the three, and can include wired, wireless, or fiber optic connections. Network 406 can include one or more wired and/or wireless networks that are capable of receiving and transmitting data, voice, and/or video signals, including multimedia signals that include voice, data, and video information. In general, network 406 can be any suitable combination of connections and protocols that can support communications between user device 402, video processing system 404, and/or other computing devices (not shown) within a distributed environment 400. In some embodiments of the present invention, distributed environment 400 is implemented as part of a cloud computing environment such as cloud computing environment 50 (FIG. 1).

User device 402 is configured to allow users to send and/or receive information to user device 402 from video processing system 404, which in turn allows users to access video presentation component 407, video scene transition component 408, eye gaze tracking component 410, video reorientation component 412, machine learning component 414, feedback component 416, and/or database 418. For example, user device 402 is configured to present a video (e.g., standard video, immersive virtual reality video, etc.) to a user via a display device such as a screen or wearable head gear, in which the video is generated and/or transmitted by video processing system 404 (e.g., via video presentation component 407). In some embodiments of the present invention, user device 402 is configured to gather user input data, biometric data, audible data, and/or visual data. For example, in some embodiment of the present invention, user device 402 includes one or more sensors for obtaining sensor data of the user, such as detecting head movement of the user, detecting a facial expression of the user, and/or tracking an eye gaze of the user. In some embodiments of the present invention, user device 402 is configured to capture audio, images, and/or video of the user (e.g., via a microphone and/or camera of user device 402).

In some embodiments of the present invention, user device 402 is a laptop computer, a tablet computer, a netbook computer, a personal computer (PC), a desktop computer, a personal digital assistant (PDA), a smart phone, an internet-of-things (IoT) enabled device, a VR/Augmented Reality (AR) display device, and/or other suitable programmable electronic devices capable of communicating with various components and devices within distributed environment 400. In some embodiments of the present invention, user device 402 comprises two or more separate devices. In some embodiments of the present invention, user device 402 is a programmable electronic mobile device or a combination of programmable electronic mobile devices capable of executing machine readable program instructions and communicating with other computing devices (not shown) within distributed environment 400. In some embodiments of the present invention, user device 402 may include internal and external hardware components, such as those depicted and described above with respect to FIG. 3.

In general, video processing system 404 is a cognitive-based tool that is able to alter video-watching experiences of users in real time using a video reorientation technique that assists in emphasizing to users what to watch in a given standard or immersive VR video at a given point in time. For example, in some embodiments of the present invention, video processing system 404 is configured to present a video to a user (e.g., via video presentation component 407, video scene transition component 408, etc.), monitor a gaze point of the user within the video as the user views one or more frames of video (e.g., via eye gaze tracking component 410), and then change the orientation of the video in response to a determination that the monitored gaze point of the user is different from a predetermined target gaze point (e.g., machine learned target gaze point, user defined target gaze point, machine learned important object within the video, user defined important object within the video, etc.). In some embodiments of the present invention, the video comprises an immersive VR video, panoramic video, or other types of three-dimensional presentations. In some embodiments of the present invention, the video comprises a two-dimension representation.

Figure 5:
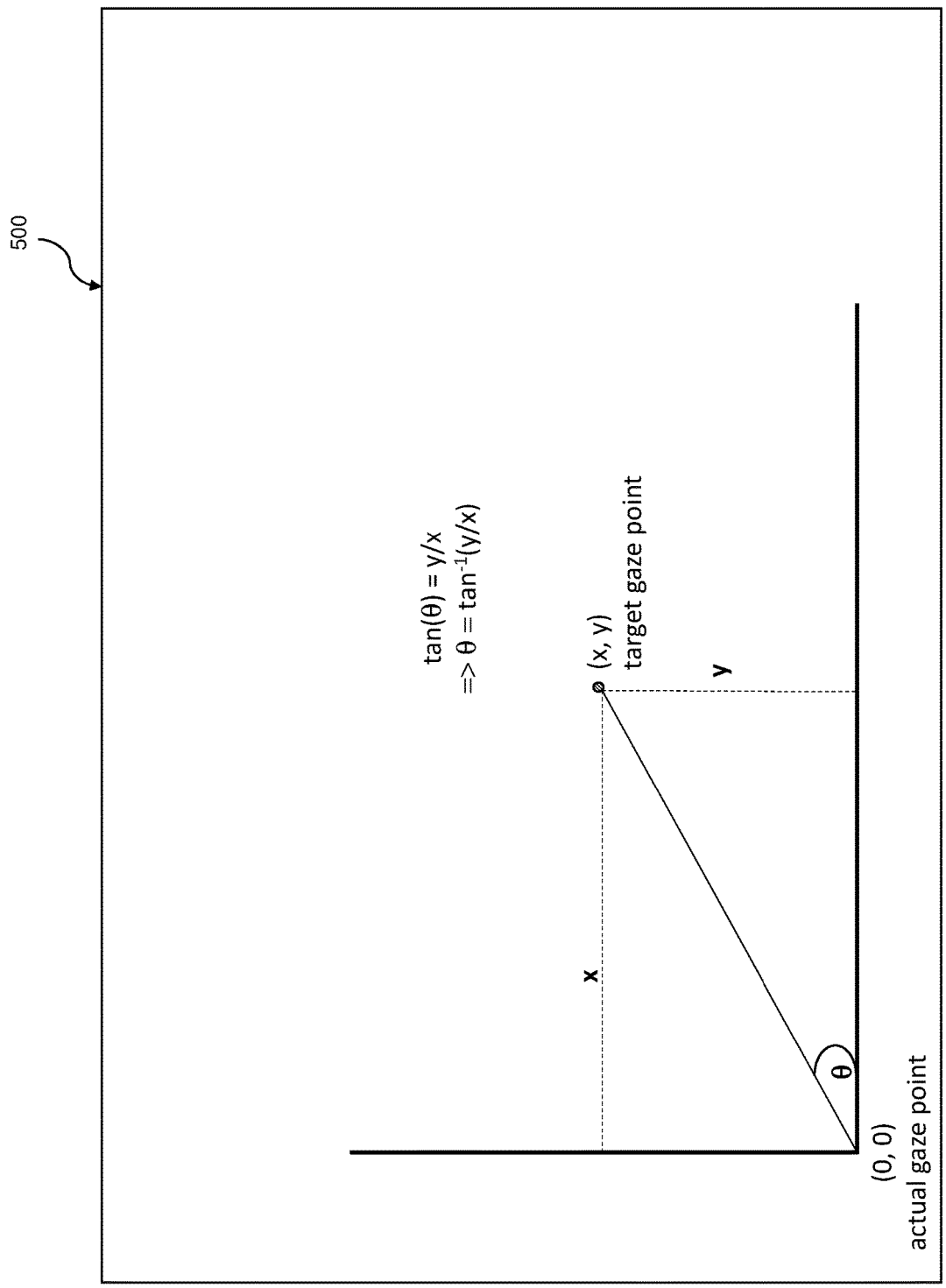
FIG. 5 depicts an example video frame in accordance with one or more embodiments of the present invention.

In some embodiments of the present invention, video processing system 404 (e.g., video reorientation component 412) is configured to change the orientation of the presented video by panning and/or zooming the video to reposition the target gaze point of the video to the actual gaze point. In some embodiments of the present invention, the reorientation is achieved by a physical movement, of the video (e.g., panning of the video). In some embodiments of the present eviction, video processing system 404 is configured to pan the video by offsetting a point of origin for rendering the video (e.g., reference point of a frame of the video) towards the direction of the actual gaze point of the user. FIG. 5 illustrates an example frame 500 of a video presentation in accordance with one or more embodiments of the present invention, in which video presentation is to be moved from coordinates of a target gaze point (x,y) to coordinates of the actual gaze point of the user (0,0). In some embodiments of the present invention, the offset is over the gradient ($\tan^{-1}$ (y/x)) towards the direction of the actual gaze point of the user.

Referring back to FIG. 4, in some embodiments of the present invention, if the panning results in cropping of the video presentation, video processing system 404 is configured to zoom out the video to fit a screen viewing window. In some embodiments of the present invention, the zooming includes zooming into a portion of the video. The reorientation of the video results in the user being able to gaze directly at target content without needing to change the location of their gaze within a frame of the video.

In some embodiments of the present invention, after reorienting the video, video processing system 404 is configured to revert the video to its original state in a slow and interactive manner (e.g., via video scene transition component 408, video reorientation component 412, machine learning component 414, feedback component 416, etc.). In some embodiments of the present invention, the reverting includes reducing the zoom and/or pan at a predetermined rate (e.g., machine learned rate, user defined rate, etc.). In some embodiments of the present invention, at each iterative step towards the original state, video processing system 404 (e.g., feedback component 416) is configured to evaluate the user's gaze point within the video. In some embodiments of the present invention, the target gaze point is a zone of a video such as, for example, a plurality of portions of the video presentation (e.g., a range of pixels of a viewing window). In some embodiments of the present invention, the actual gaze point and the targeted view point/zone on the video are recomputed iteratively by video processing system 404, in which the actual gaze point is computed as being the gaze point where the user is presently watching within the reoriented video, in which the target gaze point (or center/ hot spot of a target gaze zone) is computed as being the original gaze point offset by the video panning and/or zooming of the video.

If the evaluation of a given iteration determines that the gaze of the user is presently on the target gaze point of the video, the video processing system 404 continues to reduce the zoom and/or pan to revert the video back to the original format. In some embodiments of the present invention, the reducing of the zoom refers to zooming into the video or zooming out of the video. If the evaluation of a given iteration determines that the gaze of the user is not presently on the target gaze point in the video, then video processing system 404 again reorients the video (e.g., via panning and/or zooming) to reposition the target gaze point of the video to the present actual gaze point of the user. For example, in some embodiments of the present invention, as the user moves his/her gaze from a first actual gaze point towards the targeted gaze point/zone, the video reorientation is recomputed and the video is thus reoriented iteratively. In some embodiments of the present invention, as the user's current gaze point traverses the video movement towards the target gaze point/zone, video processing system 404 may move the video backwards towards the direction of the target gaze point/zone. In some embodiments of the present invention, the reorientation of the video is gradual and not abrupt. For example, in some embodiments of the present invention, the reorientation of the video does not exceed a speed of reorientation threshold such that the user is given adequate time to adapt his/her eye gaze towards the video. In some embodiments of the present invention, zooming out of the video is not to exceed a predetermined threshold video frame size such that the user is given an adequate viewable window to see the video. In some embodiments of the present invention, cropping is allowed to occur after the predetermined video frame size is exceeded. In some embodiments of the present invention, video processing system 404 is configured to continue to iteratively reorient the video until the user's actual gaze point is detected as being within a predetermined threshold distance to the target gaze point (or within the target gaze zone). In some embodiments of the present invention, video processing system 404 is configured to revert the video back to its original format (e.g., no zoom in/out) such that video is positioned at the original rendered screen coordinates.

In some embodiments of the present invention, video processing system 404 (e.g., machine learning component 414) is configured to train one or more machine learn models to learn a baseline behavior model of expected and outlier eye gaze patterns from users, which are given a video during a training phase such that the video is reoriented only when eye gaze patterns are detected between scene transitions as deviating from the expected eye gaze patterns. In some embodiments of the present invention, video processing system 404 classifies a given eye gaze pattern as being an outlier gaze pattern when the given eye gaze pattern of the user does not align with a video content developer's anticipated audience behavior. A scene transition can occur when, for example, one or more significant changes in the objects are detected in the video such as when a significant change in the position of the objects are detected (e.g., across two successive frames). In some embodiments of the present invention, a scene transition occurs after a sufficiently large number of frames of a video. In some embodiments of the present invention, in the case of scene transitions, the training of the machine learning models ignores the first few frames of the video (i.e., does not use these frames for learning). In some embodiments of the present invention, video processing system 404 generates a training data set of expected eye gaze patterns by aggregating the eye gaze behavior of individuals over a plurality of viewing sessions. In some embodiments of the present invention, the aggregation includes annotating zones within the video that the users most often tended to look at (e.g., objects, screen coordinates, etc.). In some embodiments of the present invention, the annotations are performed for each video from or for each video sub-scene. Each video sub-scene can be computed as a sequence of successive video frames (e.g., via video scene transition component 408). In some embodiments of the present invention, if a training data set is unavailable, visual salience features may be utilized instead. A visually salient zone/object in a given image frame (such as a frame in a video) is the zone/object that a user is likely to look at such as, for example, a moving object, a "main" person, etc. A visual saliency feature is a visually salient object represented as a feature such as, for example, the presence of moving object, a "main" person etc.

In some embodiments of the present invention, once the machine learning model is trained, video processing system 404 is configured to apply the trained machine learning model to an eye gaze pattern of a test user to classify the eye gaze as being either an expected eye gaze pattern (e.g., target eye gaze point) or an outlier eye gaze pattern. In some embodiments of the present invention, if the test user's eye gaze pattern is classified as being an outlier gaze pattern, video processing system 404 is configured to make automated adjustments to the video to correct the test user's viewing behavior (e.g., via video reorientation component 412, machine learning component 414, feedback component 416). For example, in some embodiments of the present invention, in response to classifying a test user's eye gaze pattern as being an outlier eye gaze pattern, video processing system 404 then shifts the video via panning and/or zooming to reposition the target gaze point of the video to the actual gaze point of the video, which results in the test user gazing at the target content within the video. The video is then reverted back to its original state in a slow and iterative manner by reverting the zooming and/or panning of the video. The test user's eye gaze is revaluated at each iterative step in reverting the video. If the gaze is evaluated as being on the target portion of the video, then the reduction of the zooming and/or panning is continued.

Figure 6:
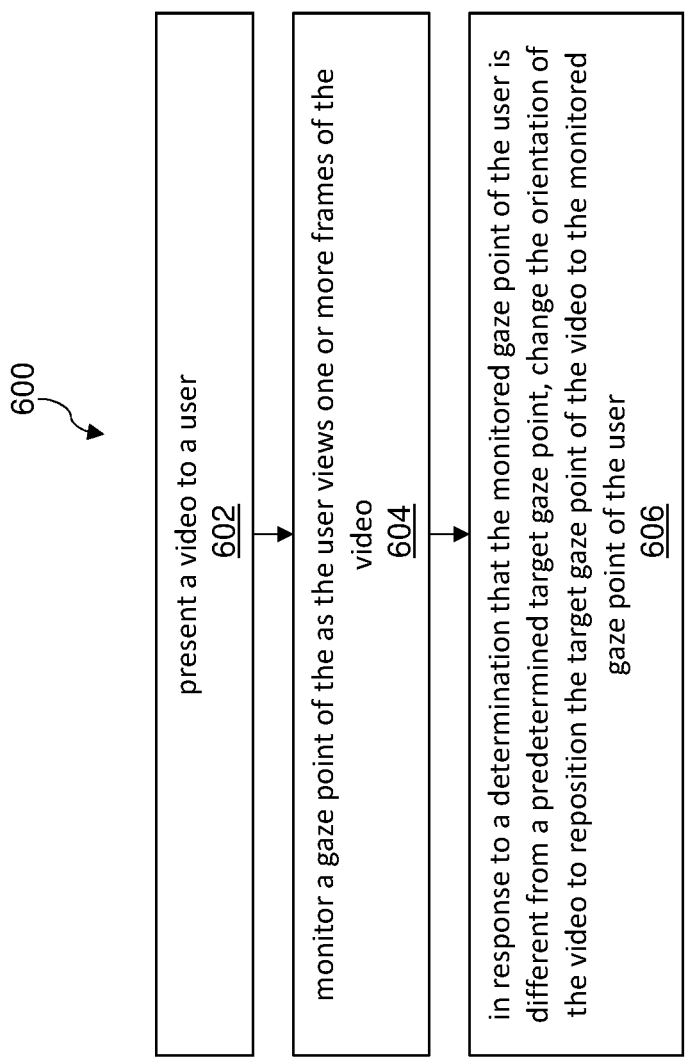
FIG. 6 depicts a flow diagram illustrating a methodology in accordance with one or more embodiments of the present invention.

Additional details of the operation of system 404 will now be described with reference to FIG. 6, wherein FIG. 6 depicts a flow diagram illustrating a methodology 600 according to one or more embodiments of the present invention. At block 602, a video is presented to a user (e.g., via video presentation component 407, video scene transition component 408, etc.). At block 604, a gaze point of the user is monitored and/or tracked as the user views one or more frames of the video (e.g., via eye gaze tracking component 410). At block 606, the orientation of the video is changed in response to a determination that the monitored gaze point of the user is different from a predetermined target gaze point (e.g., via video reorientation component 412, machine learning component 416, feedback component 416, etc.), in which the changing of the orientation includes repositioning the target gaze point of the video to the monitored gaze point of the user. In some embodiments of the present invention, the orientation of the video is changed during the presentation of the video to the user.

In some embodiments of the present invention changing of the orientation of the video includes panning and/or zooming the video to reposition the target gaze point of the video to the monitored gaze point of the user. In some embodiments of the present invention, the changing of the orientation includes offsetting a point of origin for rendering the video towards a direction of the monitored gaze point of the user, in which the offsetting is over a gradient that is based on coordinates of the target gaze point with respect to the monitored gaze point.

In some embodiments of the present invention, methodology 600 further includes reverting the orientation of the video to an original presented state over a period of time (e.g., via video scene transition component 408, video reorientation component 412, machine learning component 414, feedback component 416, etc.). In some embodiments of the present invention, the reverting includes iteratively reducing zoom and pan at a predetermined rate.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for real-time alteration of video, the method comprising:
    presenting, by a system comprising one or more processors, a video to a user;

monitoring, by the system, a gaze point of the user as the user views one or more frames of the video; and in response to a determination that the monitored gaze point of the user is different from a predetermined target gaze point, changing, by the system, orientation of the video to reposition the target gaze point of the video to the monitored gaze point of the user, wherein the orientation of the video is changed during the presentation of the video to the user; and wherein the changing of the orientation of the video includes panning the video to reposition the target gaze point of the video to the monitored gaze point of the user.

2. The computer-implemented method of claim 1, wherein the panning of the video includes offsetting a point of origin for rendering the video towards a direction of the monitored gaze point of the user, wherein the offsetting is over a gradient that is based on coordinates of the target gaze point with respect to the monitored gaze point.

3. The computer-implemented method of claim 1, wherein the changing of the orientation of the video further includes zooming a portion of the video.

4. The computer-implemented method of claim 1 further comprising:

reverting the orientation of the video to an original presented state over a period of time, wherein the reverting includes iteratively reducing zoom and pan at a predetermined rate.

5. The computer-implemented method of claim 4 further comprising:

evaluating, at each iteration during the reverting, a present gaze point of the user within the video;

determining, during the reverting, whether the present gaze point of the user is within a predetermined threshold distance to the target gaze point of the video; and in response to determining, during the reverting, that the present gaze point of the user is not within the predetermined threshold distance to the target gaze point of the video, changing the orientation of the video to reposition the target gaze point of the video to the present gaze point of the user.

6. The computer-implemented method of claim 1, wherein the video comprises immersive virtual reality video, and wherein the presenting of the video includes transmitting the immersive virtual reality video to a virtual reality device, wherein the virtual reality device is configured to display the immersive virtual reality video to the user.

7. A computer program product for real-time alteration of video, the computer program product comprising a non-transitory computer readable storage medium having program instructions embodied therewith, the program instructions executable by a system comprising one or more processors to cause the system to perform a method, the method comprising:

presenting, by the system, a video to a user;

monitoring, by the system, a gaze point of the user as the user views one or more frames of the video; and in response to a determination that the monitored gaze point of the user is different from a predetermined target gaze point, changing, by the system, orientation of the video to reposition the target gaze point of the video to the monitored gaze point of the user, wherein the orientation of the video is changed during the presentation of the video to the user; and wherein the changing of the orientation of the video includes panning the video to reposition the target gaze point of the video to the monitored gaze point of the user.

8. The computer program product of claim 7, wherein the panning of the video includes offsetting a point of origin for rendering the video towards a direction of the monitored gaze point of the user, wherein the offsetting is over a gradient that is based on coordinates of the target gaze point with respect to the monitored gaze point.

9. The computer program product of claim 7, wherein the changing of the orientation of the video further includes zooming a portion of the video.

10. The computer program product of claim 7, wherein the method further includes:

reverting the orientation of the video to an original presented state over a period of time, wherein the reverting includes iteratively reducing zoom and pan at a predetermined rate.

11. The computer program product of claim 10, wherein the method further includes:

evaluating, at each iteration during the reverting, a present gaze point of the user within the video;

determining, during the reverting, whether the present gaze point of the user is within a predetermined threshold distance to the target gaze point of the video; and in response to determining, during the reverting, that the present gaze point of the user is not within the predetermined threshold distance to the target gaze point of the video, changing the orientation of the video to reposition the target gaze point of the video to the present gaze point of the user.

12. The computer program product of claim 7, wherein the video comprises immersive virtual reality video, and wherein the presenting of the video includes transmitting the immersive virtual reality video to a virtual reality device, wherein the virtual reality device is configured to display the immersive virtual reality video to the user.

13. A system for real-time alteration of video, the system comprising one or more processors configured to perform a method, the method comprising:

presenting, by the system, a video to a user;

monitoring, by the system, a gaze point of the user as the user views one or more frames of the video; and in response to a determination that the monitored gaze point of the user is different from a predetermined target gaze point, changing, by the system, orientation of the video to reposition the target gaze point of the video to the monitored gaze point of the user, wherein the orientation of the video is changed during the presentation of the video to the user; and wherein the changing of the orientation of the video includes panning the video to reposition the target gaze point of the video to the monitored gaze point of the user.

14. The system of claim 13, wherein the panning of the video includes offsetting a point of origin for rendering the video towards a direction of the monitored gaze point of the user, wherein the offsetting is over a gradient that is based on coordinates of the target gaze point with respect to the monitored gaze point.

15. The system of claim 13, wherein the changing of the orientation of the video further includes zooming a portion of the video.

16. The system of claim 13, wherein the method further includes:
  reverting the orientation of the video to an original presented state over a period of time, wherein the reverting includes iteratively reducing zoom and pan at a predetermined rate.

17. The system of claim 16, wherein the method further includes:
  evaluating, at each iteration during the reverting, a present gaze point of the user within the video;
  determining, during the reverting, whether the present gaze point of the user is within a predetermined threshold distance to the target gaze point of the video; and
  in response to determining, during the reverting, that the present gaze point of the user is not within the predetermined threshold distance to the target gaze point of the video, changing the orientation of the video to reposition the target gaze point of the video to the present gaze point of the user.

\* \* \* \* \*